US006207086B1

(12) United States Patent
Schlagel et al.

(10) Patent No.: US 6,207,086 B1
(45) Date of Patent: Mar. 27, 2001

(54) METHOD AND APPARATUS FOR WASHING OR HYDRATION OF OPHTHALMIC DEVICES

(75) Inventors: Mark E. Schlagel, Jacksonville, FL (US); Darren S. Keene, San Jose, CA (US); Ture Kindt-Larsen, Søllerødvej 40 (DK); Wallace Anthony Martin, Orange Park, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/252,307

(22) Filed: Feb. 18, 1999

(51) Int. Cl.[7] ................................................ B29D 11/00
(52) U.S. Cl. .................. 264/2.6; 134/25.5; 134/901; 264/233; 264/344; 425/445; 425/446
(58) Field of Search ................................ 264/1.1, 2.6, 39, 264/233, 344; 134/25.5, 34, 42, 901; 425/445, 446; 206/5.1

(56) References Cited

U.S. PATENT DOCUMENTS

| Re. 36,302 | 9/1999 | Kindt-Larsen et al. ............. 425/445 |
|---|---|---|
| 1,681,839 | * 8/1928 | Breton . |
| 3,905,163 | * 9/1975 | Kleiber . |
| 4,375,992 | * 3/1983 | Stevens et al. ..................... 134/25.5 |
| 4,495,313 | 1/1985 | Larsen ................................ 523/106 |
| 4,640,489 | 2/1987 | Larsen ................................ 249/122 |
| 4,680,336 | 7/1987 | Larsen et al. ...................... 524/548 |
| 4,761,069 | 8/1988 | Truong et al. ..................... 351/160 H |
| 4,782,946 | 11/1988 | Pollak ................................ 206/223 |
| 4,889,664 | 12/1989 | Kindt-Larsen et al. ............. 264/2.6 |
| 5,039,459 | 8/1991 | Kindt-Larsen et al. ............. 264/2.6 |
| 5,080,839 | 1/1992 | Kindt-Larsen et al. ............. 264/2.6 |
| 5,094,609 | 3/1992 | Kindt-Larsen ...................... 425/445 |
| 5,172,450 | * 12/1992 | Cole et al. . |
| 5,264,161 | 11/1993 | Druskins et al. ................... 264/2.6 |
| 5,271,875 | 12/1993 | Appleton et al. .................. 264/2.3 |
| 5,476,111 | 12/1995 | Andersen et al. ................. 134/58 R |
| 5,490,959 | 2/1996 | Nunez et al. ...................... 264/2.6 |
| 5,616,184 | 4/1997 | Ducan et al. ...................... 134/22.1 |
| 5,640,980 | 6/1997 | Keene et al. ...................... 134/58 R |
| 5,649,410 | 7/1997 | Martin et al. ...................... 53/474 |
| 5,690,866 | 11/1997 | Andersen et al. ................. 264/2.6 |
| 5,706,634 | 1/1998 | Edwards et al. ................... 53/473 |
| 5,722,536 | 3/1998 | Pierce et al. ....................... 206/5.1 |
| 5,762,081 | 6/1998 | Keene et al. ....................... 134/59 |
| 5,836,323 | 11/1998 | Keene et al. ....................... 134/58 |
| 6,068,798 | 5/2000 | Lesczynski et al. ............... 264/2.6 |

FOREIGN PATENT DOCUMENTS

| 0 686 488 B1 | 12/1995 | (EP) . |
|---|---|---|
| 0 806 286A2A3 | 11/1997 | (EP) . |
| 0 824 063 A2 | 2/1998 | (EP) . |
| 0 824 063 A3 | 2/1998 | (EP) . |
| WO 97/13635 | 4/1997 | (WO) . |
| WO 00/12296 | 3/2000 | (WO) . |
| WO 00/13882 | 3/2000 | (WO) . |

* cited by examiner

*Primary Examiner*—Mathieu D. Vargot
(74) *Attorney, Agent, or Firm*—Anne B. Kiernan

(57) ABSTRACT

This invention discloses an apparatus and method for hydrating or washing ophthalmic devices, comprising the step of directing to an ophthalmic device having a higher concentration of impurities fluid which has previously been directed to ophthalmic device having a lower concentration of impurities.

35 Claims, 3 Drawing Sheets

METHOD AND APPARATUS FOR WASHING OR HYDRATION OF OPHTHALMIC DEVICES

FIELD OF THE INVENTION

The present invention relates to a method and apparatus for washing or hydration of ophthalmic devices.

BACKGROUND OF THE INVENTION

The molding of hydrophilic contact lenses is known. Various processes are disclosed in U.S. Pat. No. 4,495,313, to Larsen; U.S. Pat. No. 4,640,489 to Larsen, et al.; U.S. Pat. No. 4,680,336 to Larsen et al.; U.S. Pat. No. 4,889,664 to Larsen et al.; and U.S. Pat. No. 5,039,459 to Larsen et al., all of which are assigned to the assignee of the present invention.

These prior art references disclose a contact lens production process wherein each lens is formed by molding a reactive mixture in a lens mold, typically between a front curve (lower mold section) and back curve (upper mold section). The monomer injected in the molds is polymerized, thus forming a lens. The lens is typically subjected to a hydration bath, and then to multiple leaching steps which remove processing chemicals (leachable diluents and monomers) from the lens. The hydration bath removes the lenses from the front curve mold. Once demolded, the lens are advanced into a multi-step washing phase and then the lenses, while still wet, are removed from the washing phase and are packaged for consumer use.

In the earlier manufacturing processes for making contact lenses, the steps of hydration and diluent removal took place in large tanks. Hundreds of contact lenses were put in each tank and moved around the tank and then removed. By in-flow and out-flow streams, the tanks would be kept at a specified equilibrium level of diluent. There were several tanks with decreasing levels of diluent in which the contact lenses were soaked in sequence until they reached the equilibrium level of diluent. The contact lenses would be moved from one tank to the next until the level of diluent was below or at an acceptable level. Occasionally the tanks would be emptied for cleaning, and then refilled with clean water.

U.S. Pat. Nos. 5,080,839 and 5,094,609 disclose, respectively, a process for hydrating and washing contact lenses and a chamber for washing the contact lenses formed with a monomer or monomer mixtures of the type disclosed in the foregoing patents. The process disclosed in these patents was a significant advance; however, the transfer of lenses from the hydration phase to the washing step and the associated handling of the lenses resulted in the loss of some lenses. Plus, washing required large amounts of water and occurred in multiple soaking steps. The chamber holding the contact lens was filled with water, then after the contact lens and $H_2O$ reached equilibrium, the chamber was emptied and the steps were repeated.

As should be apparent, it would be desirable to make the hydration step more efficient, that is, to subject as many lenses as possible to hydration in the most efficient manner, using the least water possible.

BRIEF DESCRIPTION OF THE INVENTION

In accordance with the invention, a hydration and/or washing, e.g. diluent removal, apparatus and process is disclosed in which a plurality of device supporting members are provided preferably having one or more cavities each for containing an ophthalmic device, such as a contact lens and/or lens mold and/or reusable lens mold. The ophthalmic devices are arranged so that the hydration or cleansing fluid flows or is directed from contacting cleaner ophthalmic devices to contacting dirtier ophthalmic devices. The device supporting members can be arranged in any configuration so that the hydration or cleansing fluid contacts cleaner and then dirtier ophthalmic devices. The device supporting members can be arranged vertically: in-line like a column or like a stair-case, horizontally, helically or combinations of the above. For example, the fluid could flow horizontally from ophthalmic device to ophthalmic device on a first level of one or more device supporting members arranged horizontally and then flow vertically down and across to a second level of one or more device supporting members located beneath the first level, and then flow to a third level, etc. Alternatively, ophthalmic devices can be moved within a column in which the water falls like rain, or in a horizontal pipe through which a stream of fluid is pumped. Preferably the arrangement is at least partially vertical so that the hydration or cleansing fluid moves under gravity and does not have to be pumped. The hydration or cleansing fluid can be directed to move in a single stream from the cleanest ophthalmic device to the dirtiest ophthalmic device in the apparatus. Alternatively, the fluid can be directed to move in multiple streams from one or more of the cleanest ophthalmic devices to one or more of the dirtiest ophthalmic devices in the apparatus. The flow of fluid can be across ophthalmic devices and device supporting members or it can be through or both across and through the device supporting members. Preferably, multiple streams of the hydration or cleansing fluid can be directed to flow onto and across only ophthalmic devices in particular locations from clean to dirty ophthalmic devices in the apparatus. Preferably, the fluid flows across the device supporting members. If desired, additional fluid can be injected at one or more locations in the apparatus. The cleanest ophthalmic devices from the apparatus are removed at or near, that is in the vicinity of the input of clean hydration or cleansing fluid into the apparatus, and dirty ophthalmic devices are inserted into the apparatus preferably just before or in the vicinity of where the dirtiest hydration or cleansing fluid exits the apparatus.

The preferred hydration and/or washing apparatus and process comprises trays as the device supporting members. However, the device supporting members can have any configuration, which provides protection for and maintains the ophthalmic device but allows fluid to flow to, and around or over the ophthalmic device in or on the device supporting member, and then allows the fluid to flow out of the device supporting member. Other examples of device supporting members include a plastic cage, bowl, or the hydration and washing chambers for contact lenses used and disclosed in the prior art. It is further preferred that the device supporting member can be easily moved through the apparatus countercurrent to the flow of the fluid. In the preferred embodiment, the device supporting member is a lens supporting member, and the preferred lens supporting member is a tray. The preferred trays have a plurality of cavities each for containing an ophthalmic device, and preferably for containing a front curve mold with a contact lens in the mold. The following description will focus on the preferred embodiment involving the washing and hydration of contact lenses; however, other devices, particularly other ophthalmic devices may be substituted for the contact lenses in the description.

In the preferred embodiment, the trays are stacked vertically with the cavities (and lenses) in columns. The hydration or cleansing fluid, for example, de-ionized (DI) water, is injected or otherwise introduced into each of the cavities of the leading or upper tray. The fluid injected in each cavity flows downwardly through the stack of cavities of the column to wash over the lenses preferably in the front curve molds in the trays below the point where the fluid is injected. If desired, additional fluid also can be injected at one or more lower trays in the stack. In using the apparatus, a tray is inserted at the stack bottom, the stack is raised, and the uppermost tray in the stack is removed. The addition and removal of trays to the stack is carried out in a step-wise manner.

As lenses (in the trays) move upwardly in the stack, they encounter increasingly purer (less contaminated) hydration or cleansing fluid. The more contaminated fluid contacts the lenses at lower positions in the stack, but is still able to remove contaminants.

There is a counter-current effect, that is, the fluid flows downwardly in the apparatus and the trays with lenses move progressively upward. A vertical configuration is preferred, because the fluid flows down; however, other configurations, including horizontal, in which the fluid is pumped can be used. As the fluid flows from cleaner to dirtier lenses, it picks up the impurities from the lenses. As the lenses move toward the inlet of clean fluid, they have fewer impurities. Preferably, the concentration of impurities in the fluid is always less than the concentration of impurities in the lenses which it is contacting.

According to one aspect of the invention, a method for hydrating or washing ophthalmic devices includes the steps of applying to an ophthalmic device, which has a higher concentration of impurities, a fluid which has previously been applied to ophthalmic devices having a lower concentration of impurities, said fluid having previously been applied to ophthalmic devices having an even lower concentration of impurities. At least a portion of the same fluid preferably is applied to at least 10, more preferably at least 25 ophthalmic devices, e.g. contact lenses, which have substantially sequentially increasing amounts of impurities. For example, lenses having high concentrations of impurities can be lenses having greater than 10,000 ppm, or even greater than 100,000 ppm diluent or other impurities in the lens, and lenses having low concentrations of impurities can be lenses having less than 10 ppm, more preferably less than 1 ppm diluent or other impurities in the lens. Preferably the same fluid, or at least a portion of the same fluid, which is applied to contact lenses having a low concentration of impurities is later applied to contact lenses having a high concentration of impurities. Preferably the contact lenses move countercurrently to the fluid, and/or (preferably and) the fluid moves countercurrently to the lenses. Preferably, the flow of the fluid is directed from lenses having lower concentrations of impurities to lenses having higher concentrations of impurities, such that the amount of impurities in the fluid increases as the fluid is directed at contact lenses having increasing amounts of impurities. It is preferred that the concentration of impurities in the fluid is such that, a concentration gradient between the level of impurities in the fluid and the lenses is substantially maintained, such that impurities substantially continuously or successively, for example, in stages e.g. at the different levels in the stack, move into the fluid from the cleaner contact lenses and then from the contact lenses having increasingly higher levels of impurities. Preferably the impurities move substantially continuously from the contact lenses into the fluid. The contact lenses enter the apparatus of this invention with a high concentration of impurities and are preferably subjected to increasingly cleaner fluid as the contact lenses become increasingly cleaner. The lenses having the lowest concentration of impurities of any lenses contacting any fluid in this method, have clean, preferably the cleanest, fluid directed at them. In the preferred embodiment the lenses move in stages and the fluid flows continuously or semi-continuously, e.g. in pulses of fluid, countercurrently relative to the movement of the lenses; however, the lenses could also move continuously or semi-continuously countercurrently relative to the movement of the fluid, or both. In this method, the lenses are preferably contained in lens supporting members. In the preferred embodiment, the lenses are in trays, with the trays arranged in a vertical stack. Preferably there are multiple lenses in each tray; however, the trays can be made to hold individual lenses. The concentration of impurities in the lenses in the vertically arranged trays decreases as the lenses advance toward the top of the stack. The fluid is clean at the top of the stack and exits at the bottom of the stack with a high concentration of impurities.

In accordance with another aspect of the invention, a hydrating or washing method includes the steps of vertically arranging, e.g. stacking, a plurality of device supporting members each having a cavity containing an ophthalmic device, and injecting a fluid into the cavity of an upper device supporting member, the fluid flowing downwardly through the cavities. In the preferred form, the downward flow of fluid is directed to a lens contained in the cavity of a lower tray in a stack of trays. Also, the trays can be aligned above one another to define a flow path therebetween.

In accordance with another aspect of the invention, an apparatus for hydrating or washing contact lenses includes a means for applying fluid to a lens having a low concentration of impurities, and a means for directing the applied fluid to further lenses which have a comparatively higher concentration of impurities.

According to a still further aspect of the invention, a hydrating or washing apparatus for contact lenses includes a plurality of trays each containing a lens, wherein the trays are vertically stacked, with the cavities arranged in a vertical column. Each cavity has an opening which permits fluid to flow to the cavity of a next lower tray in the stack to thereby wash the lens therein. The apparatus further has an injection passage into which the fluid is injected into the cavity to thereby flow into the opening and to the cavities of lower trays in the vertical column.

Further features and aspects of the invention can be appreciated from the following detailed description and accompanying drawings.

OBJECTS OF THE INVENTION

It is an object of the invention to provide a novel method and apparatus for hydration and/or removal of impurities from ophthalmic devices.

A further object is to provide a contact lens hydration and/or washing method and apparatus in which the lenses are stacked vertically in trays which are moved upwardly, and a fluid flows downwardly in the tray stack to successively wash the lenses in the lower trays of the stack. The fluid may be introduced at the top of the stack or fresh fluid or a different fluid composition may be introduced at various points in the process and method.

An additional object is to provide a method and apparatus for efficiently washing ophthalmic devices in an apparatus in which the fluid cascades downwardly over the ophthalmic device.

Yet a further object is to hydrate and was ophthalmic devices stacked vertically in a column using the same fluid.

Still a further object is to reduce the amount of water consumed during a hydration and/or washing phase.

Yet another object is to increase the rate of diffusion during a hydration and/or washing phase.

Still another object is to reduce the amount of lens handling as the lenses are brought to and removed from the hydration phase.

BRIEF DESCRIPTION OF THE DRAWINGS

Other objects and advantages of the present invention will become more apparent upon reference to the following specification and annexed drawings in which.

DETAILED DESCRIPTION OF THE PREFERRED EMBODIMENT

Figure 1:
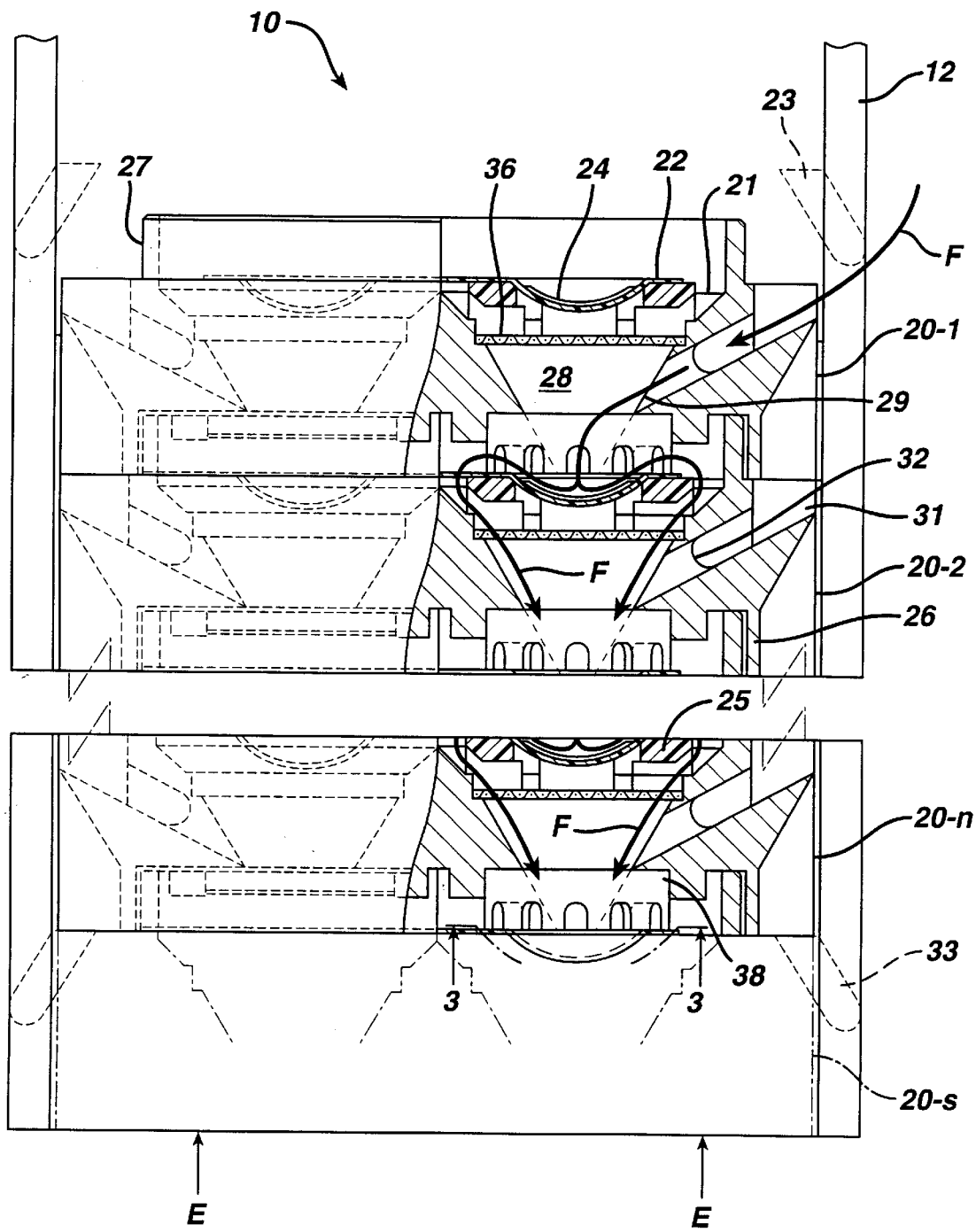
FIG. 1 is an elevational end view of a portion of a hydration apparatus according to the invention, with the end wall partially broken away to reveal a sectional view of a plurality of lens supporting trays therein.

Referring to FIG. 1, the hydration apparatus 10 has a frame 12 within which are stacked vertically a plurality of trays 20 made of a suitable material, such as plastic. Three such trays 20-1, 20-2, 20-n are illustratively shown. In a typical application, there can be as many trays as needed, preferably between thirty and fifty trays stacked one above or on top of another.

Figure 2:
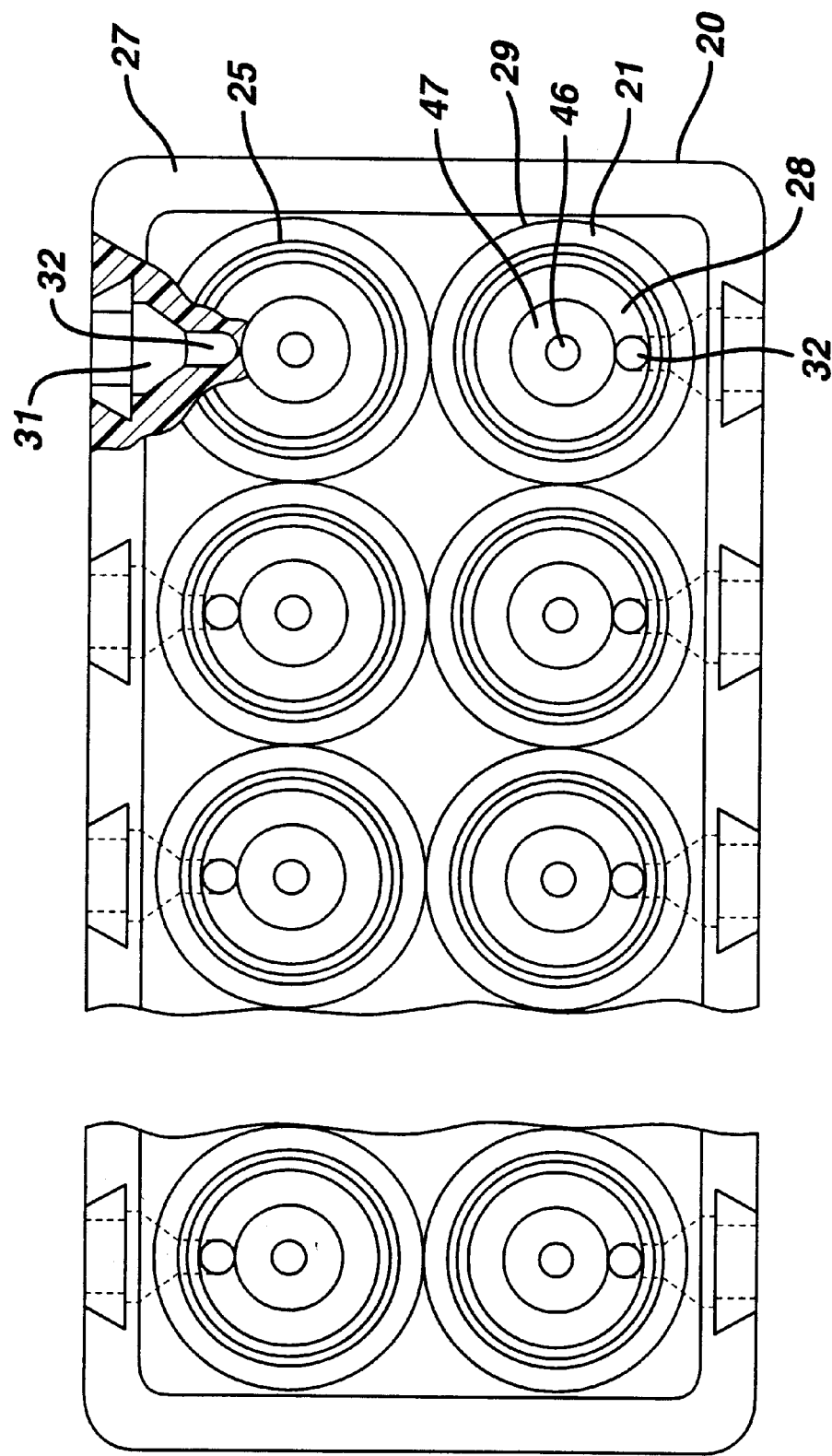
FIG. 2 is a top plan view of a portion of a tray which is conveyed through the apparatus of FIG. 1.

FIG. 2 shows a sectional, top view of a portion of one of the trays 20. The tray 20 is divided into an array of effective cavities 29, preferably 2×8, i.e., two wide and eight long. These cavities are preferably bored through a solid plastic tray material. Each cavity 29 is preferably generally funnel-shaped through the tray with a wider opening where the lens 24 is held.

In a preferred embodiment, a lens support 25 of plastic or other suitable material is supported by (that is, placed in, attached to, or is an integral part of the tray) the tray within each cavity 29 of the tray 20. The preferred lens support 25 is a separate plastic piece which fits into the top of the cavity 29. The lens support 25 is a circular aperture, or concave recess which supports a front curve mold 22 into which a lens 24 may be disposed. Alternatively, the lens can be supported in the lens support 25 without the front curve mold 22. In such an embodiment, the lens support 25 could have an alternative shape such as a bowl or cage.

A flow port 31 having a wide mouth provides access to a narrower fluid injection passage 32 which connects to the central portion 28 of the cavity 29, preferably below the lens support 25. The fluid injection passage 32 is preferably cylindrical in shape. A filter screen 36 is disposed within the cavity 29 in register with and below the lens support 25. The filter screen 36 catches any debris that may wash off the lens or front curve mold 22 to prevent blockage of the orifice 46 in the top chamber insert 38. The bottom end of one cavity 29 communicates with top chamber insert 38. The top chamber insert 38 is preferably a separately machined or molded plastic piece which is attached to the bottom of each cavity 29. In the preferred embodiment in a vertical stack of trays, the top chamber insert 38 of each tray, except the lowermost tray, is located above each lens support 25 carried by the tray directly below the top chamber insert 38.

Figure 3:
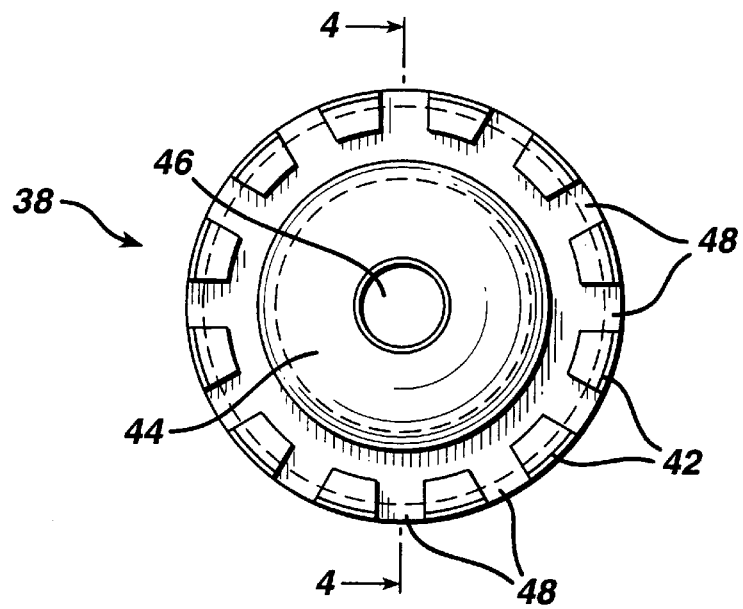
FIG. 3 is a top plan view of a top chamber insert which may be used in the present invention, taken along line 3—3 of FIG. 1.
Figure 4:
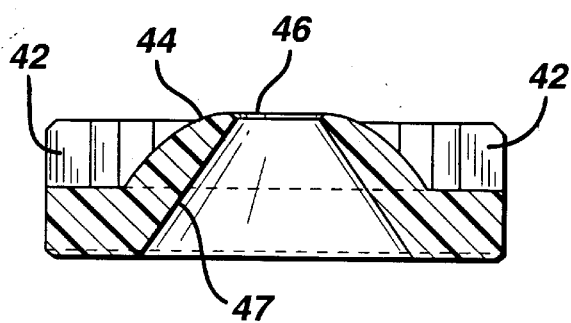
FIG. 4. is a sectional view taken along line 4—4 of FIG. 3.
Figure 5:
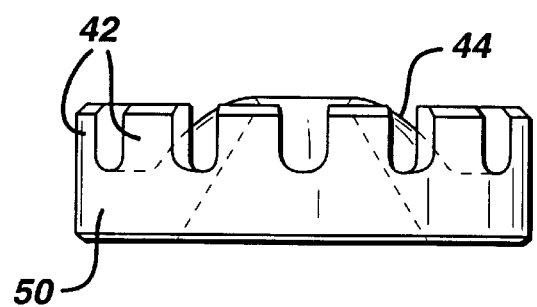
FIG. 5 is a side view of the top chamber insert.

As shown in FIGS. 3–5, the top chamber insert 38 comprises an annular ring 50 from which extends a plurality of spaced fingers 42 defining openings 48. During the hydration process the top chamber insert 38 is located directly over the front curve mold 22 and lens 24. The top chamber insert 38 has a preferably convex central area 44. The top chamber insert 38 further comprises a tapered channel 47, and a central orifice 46 which direct fluid to the lens 24 in the tray 20 below. The fluid flows out of the central orifice 46 over the lens 24 through the openings 48 between the spaced fingers 42 and into the passages 21 adjacent to and below the lens 24. The chamber insert 38 prevents the lens 24 from being washed out of the front curve mold 22 and lens support 25 while directing the flow of fluid, and thereby protects the lens 24 and the front curve mold 22.

The trays are preferably stacked one above the other to form one or more vertical columns of lens cavities. Preferably, each cavity 29 of a tray 20 is physically isolated from the other cavities 29 of the same tray 20. Preferably the fluid flows in each vertical column of cavities from the top tray to the bottom tray. That is, for example, fluid injected into the cavity 29 via the flow port 31 and the injection passage 32 of the top tray 20-1 flows down in the column of cavities following the flow path shown by the arrows F in each cavity 29 of trays 20-1, 20-2 and 20-n. Alternatively or in addition to, fluid may be introduced to the cavities of the top tray 20-1 onto the lens or via flow passages 21.

The fluid is directed to and flows generally downwardly from passages 21 and/or 32 into the cavity 29. As shown by F, the fluid flows through the central portion 28, through the tapered channel 47 and the central orifice 46 of the top chamber insert 38 to the lens 24, which may be seated in the front curve mold 22, within the lens support 25. The convex central area 44 of the chamber insert 38 maintains both lens shape and lens position during the process. The central orifice 46 of the top chamber insert 38 is in register with the lens 24 in the cavity 29 of each lower tray 20 in the vertical column of trays. The fluid flows onto, over, and around the lens 24, over the front curve mold 22 (if present), through one or more openings 48 in the top chamber insert 38 of the tray 20 above, through flow passage 21, across the filter screen 36 through the central portion 28 of the cavity 29 and to and through the top chamber insert 38 of each cavity 29.

In the preferred embodiment, there is no cross-flow of fluid between the cavities 29 of a tray 20, this being prevented by design of the cavities in the tray. In the preferred embodiment, the fluid introduced into any cavity flows into the next cavity which is located directly beneath it in the stack.

The trays 20 are fed into the apparatus 10 from the bottom and removed from the top. The stack of trays are indexed up when a new tray is inserted at the bottom and lifted into the stack, at the same time one tray is removed from the top of the stack. In the preferred embodiment, these actions are controlled by mechanically driven devices and latches, together which lift and index up the stack of trays. Support and proper placement of the trays in the stack is preferably aided by a structure or tray shape, e.g. an undercut 27 on the top of each tray which fits into a complementary structure or shape, e.g. a lip 26 on the bottom of each tray.

After lenses 24, preferably in front curve molds 22, are placed into each lens support 25 on top of a tray 20, the tray 20 is introduced into the bottom of the stack. Before introduction of the tray into the stack, the stack of trays are supported by multiple latches 33 attached to the frame 12 located below the lowermost tray 20-n. Beneath the lowermost tray 20-n supported by latch 33 is a space for insertion of a tray 20-S shown in phantom lines. Beneath the space 20-S is an elevator type mechanism illustrated by the arrows E. Once tray 20-S is properly located beneath tray 20-n, the elevator mechanism E moves the tray into the stack, indexing the stack up one position. Tray 20-n will move into the level in which tray 20-n is shown and the top tray shown as 20-1 is indexed up and disengaged from the stack via latches 23 which are attached to the frame 12 above the top of the stack. The disengaged tray which carries lenses which have completed the hydrating and/or washing process can then be removed from the apparatus 10 and placed into an area for further processing, such as packaging.

The latches are preferably attached to the frame and are preferably spring-loaded latches which support the bottom tray and the tray removed from the stack. The latches are actuated by the elevator which raises the stack of trays above the spring-loaded latches and then the stack is lowered down onto the latches. Alternatively, latches can be located on the trays with openings or cogs in the frame 12 to support the stack of trays. In the preferred mode, the latches are of the mechanical type, for example, the spring loaded type. Alternatively, any suitable mechanism(s) can be used to support and move the trays 20 upwardly within the apparatus 10.

In the preferred embodiment, fresh DI-water is used as the hydrating and leaching fluid and is directed as a pulsed stream into each fluid port 31 of the tray 20 at the top of the stack and flows through the fluid injection passages 32 of the top tray 20-1. This occurs at a point below the lenses 22 in the top tray. Alternatively or in addition to, fluid can be added to the apparatus 10 by dripping it onto the top lens 24 in the top tray of the stack. The fluid flows through each cavity 29 in the stack as described earlier. The DI-water cascades down the columns of cavities of the tray stack allowing the lenses 24 to absorb water for lens release from the front curve mold 22, exchange the fluid for extraction of diluents (impurities), and/or hydrate or other processing of the lenses.

As can be appreciated, the lenses supported on each tray added to the stack will contain more impurities than the lenses supported on the last of the previously added trays, which moves up with the addition of another tray. As each tray rises up the stack, it is subjected to further and additional hydrating and/or washing, and such tray will have undergone more hydrating/washing than a newly added tray. However, for an uninterrupted process, for all the trays which leave the stack, for example, to proceed to a packaging process, the lenses on those trays will have experienced the same amount of hydration and/or washing.

The hydrating and/or washing solutions, solvents, fluids, liquids, gases, or vapors, which may contain surfactants or other processing aids are well referred to herein as fluids. The fluid for the process is preferably heated in an on-line tank or heater and is preferably DI-water having a small amount of Tween-80, a surfactant. The DI-water is delivered to the fluid port 31 of the top most tray by means of a manifold fed from insulated tubing (not shown) at a relatively high temperature, e.g. 85–95° C., but a temperature that does not affect the lens, and is monitored to ensure proper temperature and flow rate for processing control. The high temperature increases the thermal energy and the diffusion rate, and minimizes processing time. Water flowing out of the bottom of the stack is directed through a heat exchanger (not shown) to recover energy by heating incoming water and cooling the outflow before proceeding to a drain or recycle reservoir.

While the invention has been described as injecting the fluid into the uppermost tray 20, fluid also can be injected at the same time into one or more trays at lower levels. For example, the same fluid or some other fluid e.g. solvent can be injected at a lower tray, e.g., the next to lowest tray to wash the lenses in the lowest tray, which have the highest level of diluent or impurities on the lenses. The fluid added at lower tray levels can replace or be in addition to the fluid from the upper trays.

In essence, lenses 24 disposed in the front curve molds 22 of a tray 20 enter the bottom of the stack and they are moved in a timed and stepped manner to the top of the stack. During the upward movement, cascading fluid from the upper stages removes the residual diluents, monomers and/or impurities from the lens 24 and/or releases the lens 24 from the mold 22. This provides a counter-current leaching system.

Preferably high temperature DI-water (fluid) is directed onto the lens disposed within each of the front curve molds 22 or otherwise within the lens supports 25. Lens release from the front curve mold 22 occurs substantially simultaneously with initial extraction of the leachables. Continued exposure of the lens to DI-water in the front curve mold 22 will remove the leachables, completing the extraction. DI-water flow rates are controlled to ensure good displacement of the DI-water volume in each cavity. The flow rate is also critical to maintain a low temperature gradient down the stack. Injected DI-water is fed from hypodermic tubes and may be continuous or pulsed (semi-continuous). Pulsed flow produced the lowest water consumption that still provided acceptable results.

A significant improvement in lens through-put and yield is obtained by minimizing the lens material handling. In the preferred hydration and washing apparatus and method of the invention, once the lenses are placed in the lens support 25, the lenses (or front curve molds) are not handled during the process.

Typically, about 125 to about 190 ml/minute of distilled water is provided in pulsed or continuous flow to hydrate and clean approximately ninety lenses in one column of cavities traveling through the vertical hydrating stack. This method and apparatus provide useable lenses in less than 10 minutes while using less than 40 ml of distilled water per lens.

As used herein, the term "injected" refers to the introduction of a fluid to the apparatus, and includes fluid introduction under pressure, in a stream, droplets, continuous and intermittent flows, and fluid injected in the form of a vapor. Also, the term "impurities" refers to processing chemicals such as leachable diluents and monomers which are ordinarily washed away from a manufactured contact lens prior to packaging.

All patents, applications, publications, and the method mentioned herein are hereby incorporated by reference.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed:

1. A method of hydrating or washing ophthalmic devices, comprising the step of directing to an ophthalmic device having a higher concentration of impurities fluid which has previously been directed to ophthalmic device having a lower concentration of impurities.

2. The method as in claim 1, wherein said fluid flows countercurrently to a motion of said ophthalmic devices.

3. The method as in claim 1, wherein a concentration gradient between the level of impurities in said ophthalmic device and said fluid is substantially maintained throughout said method so that the impurities substantially continuously flow into said fluid.

4. The method of claim 1, wherein a concentration gradient between the level of impurities in said ophthalmic device and said fluid is substantially maintained throughout said method so that the impurities substantially semi-continuously flow into said fluid.

5. The method as in claim 1, further comprising the step of applying clean fluid to said ophthalmic device having the lowest concentration of impurities in said method.

6. The method as in claim 1, wherein one or more ophthalmic devices are contained in a plurality of device supporting members.

7. The method as in claim 1, wherein said ophthalmic devices are contact lenses.

8. The method as in claim 1, wherein said ophthalmic devices are reusable molds.

9. A method of hydrating or washing ophthalmic devices, comprising the steps of:
    a) arranging a plurality of device supporting members each having at least one cavity containing an ophthalmic device; and
    b) introducing a fluid into a cavity of at least one of said device supporting members to flow through more than one of said cavities of said device supporting members.

10. The method as in claim 9, including the additional step of moving said device supporting members countercurrently to said fluid.

11. The method as in claim 9, wherein said plurality of device supporting members are arranged vertically and the cavity of each of said plurality of device supporting members is aligned above one another to define a flow path therebetween.

12. The method as in claim 9, wherein said device supporting members are contact lens supporting members.

13. The method as in claim 9, wherein said device supporting members are trays.

14. The method as in claim 13, including the additional steps of inserting a tray below the lowermost tray of the stack, moving the tray stack including the inserted tray upwardly and removing the uppermost tray from the stack.

15. The method as in claim 14, wherein the fluid is injected into the cavity of the uppermost tray of the stack.

16. The method as in claim 15, wherein fluid is injected into at least one other cavity below said uppermost tray.

17. The method as in claim 15, wherein said ophthalmic device is a contact lens.

18. The method as in claim 17, including the additional steps of providing a top chamber insert on each tray and directing the flow of fluid toward the lens contained in a lower tray using the top chamber insert.

19. The method as in claim 17, wherein each of said trays has a plurality of cavities, each containing a lens, said cavities of each of said plurality of trays being aligned above one another to define a like plurality of columns of cavities.

20. The method as in claim 10, wherein said ophthalmic device is a reusable mold.

21. A hydrating or washing apparatus for ophthalmic devices comprising:
    a) means for applying a fluid to an ophthalmic device having a low concentration of impurities; and
    b) means for directing the applied fluid to further ophthalmic devices having a comparatively higher concentration of impurities.

22. The apparatus of claim 21, wherein said fluid moves countercurrently to said ophthalmic devices in said apparatus.

23. The apparatus of claim 22, wherein a concentration gradient between the level of impurities in said ophthalmic devices and said fluid is substantially maintained throughout said method so that the impurities substantially continuously flow into said fluid.

24. The apparatus of claim 22, wherein a concentration gradient between the level of impurities in said ophthalmic devices and said fluid is substantially maintained throughout said method so that the impurities substantially semi-continuously flow into said fluid.

25. The apparatus of claim 21, further comprising a plurality of device supporting members to hold one or more ophthalmic devices.

26. The apparatus of claim 25, wherein said device supporting members are lens supporting members and said ophthalmic devices are contact lenses.

27. The apparatus of claim 21 further comprising:
    a plurality of device supporting members each having a cavity containing an ophthalmic device said supporting members being vertically arranged;
    wherein said means for directing is an opening in said cavity to permit fluid to flow to a cavity of a lower device supporting member to wash the device therein, and
    wherein said means for applying comprises an injection passage into which the fluid is injected into a cavity of at least one of said device supporting members.

28. The apparatus of claim 27, wherein said device supporting members are trays stacked vertically with said cavities arranged in a vertical column.

29. The apparatus of claim 28, wherein each of said cavities is isolated from fluid flow from the other cavities of the tray.

30. The apparatus of claim 28, further comprising an elevator mechanism to move the stack of trays upwardly.

31. The apparatus of claim 30, wherein said means for directing further comprises: a top chamber insert affixed to each cavity, said top chamber insert directing the flow of the fluid over and around the device of a lower tray in the stack.

32. The apparatus of claim 31, wherein said ophthalmic device is a contact lens.

33. The apparatus of claim 31, wherein said ophthalmic device is a reusable mold.

34. The method as in claim 9, wherein said arranging step configures said cavities so that the flow path from one cavity to the next cavity is defined.

35. The method as in claim 11, wherein said fluid is introduced onto said ophthalmic device on said device supporting member at the top of said vertical arrangement.

* * * * *